United States Patent
Beri et al.

(10) Patent No.: US 12,282,193 B2
(45) Date of Patent: Apr. 22, 2025

(54) FERRULE-LESS FIBER OPTIC CONNECTORS, SYSTEMS, AND METHODS

(71) Applicant: CommScope Technologies LLC, Hickory, NC (US)

(72) Inventors: Stefano Beri, Zaventem (BE); Danny Willy August Verheyden, Gelrode (BE); Jozef Christiaan Mathieu Versleegers, Bree (NC); Thierry Declerck, Kumtich (BE); Alfons Rudi Hermans, Sint-Truiden (BE)

(73) Assignee: CommScope Technologies LLC, Hickory, NC (US)

( * ) Notice: Subject to any disclaimer, the term of this patent is extended or adjusted under 35 U.S.C. 154(b) by 276 days.

(21) Appl. No.: 18/005,746

(22) PCT Filed: Jul. 16, 2021

(86) PCT No.: PCT/US2021/041979
§ 371 (c)(1),
(2) Date: Jan. 17, 2023

(87) PCT Pub. No.: WO2022/016056
PCT Pub. Date: Jan. 20, 2022

(65) Prior Publication Data
US 2023/0296848 A1    Sep. 21, 2023

Related U.S. Application Data
(60) Provisional application No. 63/053,172, filed on Jul. 17, 2020.

(51) Int. Cl.
*G02B 6/25*    (2006.01)
*G02B 6/26*    (2006.01)
(Continued)

(52) U.S. Cl.
CPC ............... *G02B 6/25* (2013.01); *G02B 6/262* (2013.01); *G02B 6/3809* (2013.01);
(Continued)

(58) Field of Classification Search
CPC ............................... G02B 6/3809; G02B 6/25
See application file for complete search history.

(56) References Cited

U.S. PATENT DOCUMENTS 7,142,741 B2 * 11/2006 Osborne .................. G02B 6/25
385/33
2003/0053758 A1    3/2003 Monte
(Continued)

FOREIGN PATENT DOCUMENTS

EP    2 549 314 A1    1/2013
GB    2376754 A    12/2002
(Continued)

OTHER PUBLICATIONS

Extended European Search Report from European Patent Office dated Jun. 18, 2024 for European Application No. EP21841903.
(Continued)

*Primary Examiner* — Michelle R Connelly
*Assistant Examiner* — Marc E Manheim
(74) *Attorney, Agent, or Firm* — MERCHANT & GOULD P.C.

(57) ABSTRACT

The present disclosure relates generally to ferrule-less fiber optic connectors, systems, and methods for enhancing the physical contact or connection interface between a first plurality of optical fibers and a second plurality of optical fibers after a cleaving process. The present disclosure is directed at ensuring proper alignment and performance of mated optical fibers by controlling the orientation of major flared sides relative to a connector keying feature.

24 Claims, 13 Drawing Sheets

(51) Int. Cl.
    *G02B 6/36*         (2006.01)
    *G02B 6/38*         (2006.01)
    *G02B 6/40*         (2006.01)

(52) U.S. Cl.
    CPC ......... *G02B 6/3825* (2013.01); *G02B 6/3831* (2013.01); *G02B 6/40* (2013.01); *G02B 6/3636* (2013.01)

(56) References Cited

U.S. PATENT DOCUMENTS

| | | |
|---|---|---|
| 2004/0071407 A1 | 4/2004 | Vergeest |
| 2010/0183265 A1 | 7/2010 | Barnes et al. |
| 2017/0254967 A1 | 9/2017 | Lu et al. |
| 2017/0351031 A1 | 12/2017 | Shastri et al. |
| 2018/0011253 A1 | 1/2018 | Childers et al. |
| 2018/0045897 A1* | 2/2018 | Chia .................. G02B 6/4296 |
| 2018/0329155 A1 | 11/2018 | Verheyden |

FOREIGN PATENT DOCUMENTS

| | | |
|---|---|---|
| WO | 2012/112344 A1 | 8/2012 |
| WO | 2016/100384 A1 | 6/2016 |
| WO | 2018/020022 A1 | 2/2018 |
| WO | 2020/112645 A1 | 6/2020 |

OTHER PUBLICATIONS

International Search Report and Written Opinion of the International Searching Authority for International Patent Application No. PCT/US20211041979 mailed Nov. 17, 2021.

* cited by examiner

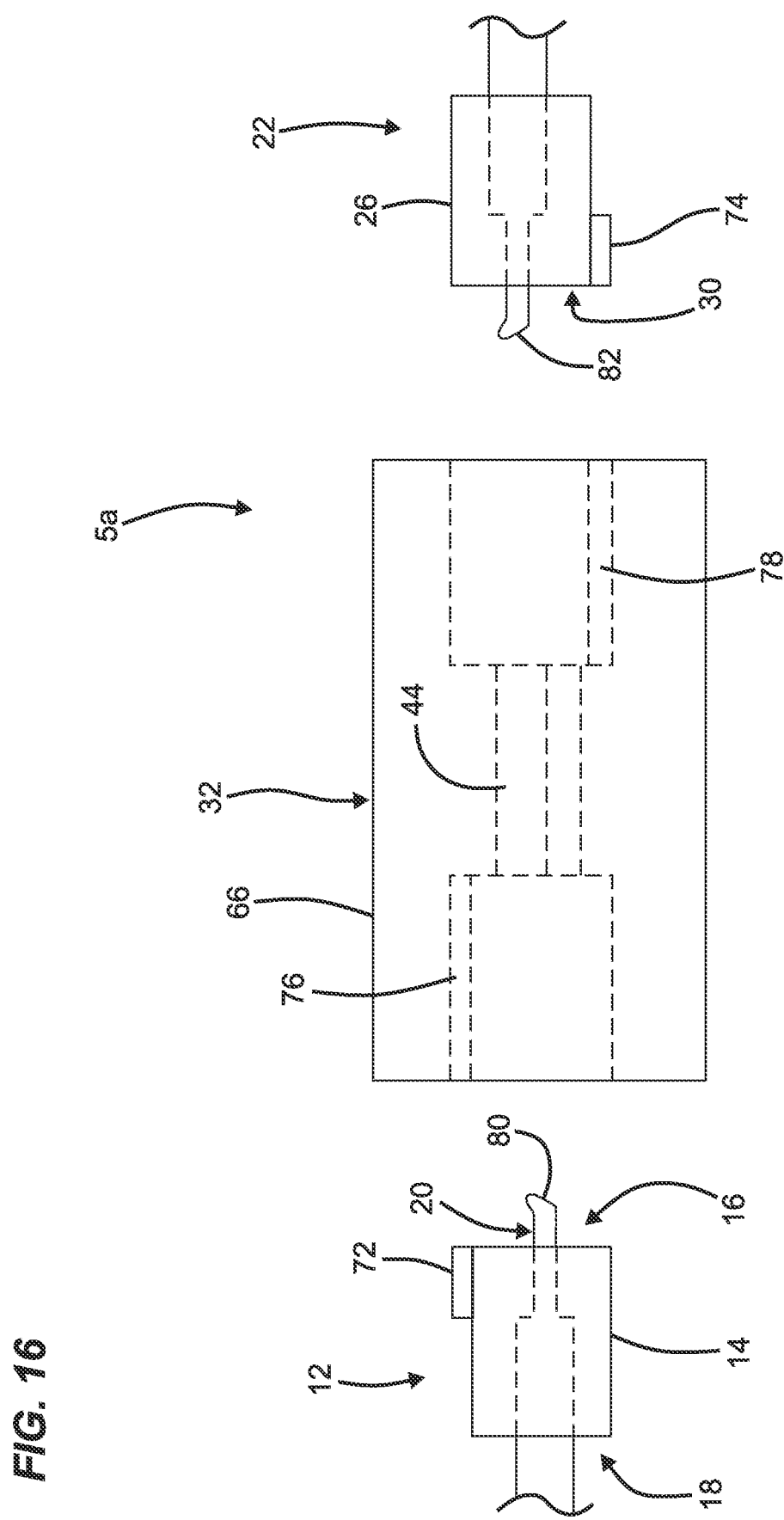

FERRULE-LESS FIBER OPTIC CONNECTORS, SYSTEMS, AND METHODS

CROSS-REFERENCE TO RELATED APPLICATION

This application is being filed as a National Stage Application of PCT International Patent Application PCT/US2021/041979, filed on 16 Jul. 2021, and claims the benefit of U.S. Patent Application Ser. No. 63/053,172, filed on Jul. 17, 2020, the disclosures of which are incorporated herein by reference in their entireties.

TECHNICAL FIELD

The present disclosure relates generally to multi-fiber connectivity. More particularly, the present disclosure relates to ferrule-less multi-fiber fiber optic connectors, systems and methods.

BACKGROUND

Fiber optic connectors are commonly used in optical fiber communication systems to effect dematable optical connections between waveguides such as optical fibers. A typical optical connection is made by co-axially aligning two optical fibers in end-to-end relation with end faces of the optical fibers opposing one another. To effect optical coupling and minimize Fresnel loss, it is typically preferred for "physical contact" to exist between the optical waveguides, which, in the case of optical connectors, is generally between the opposed end faces of the aligned optical fibers.

Traditionally optical connectors have employed "ferrules." Ferrules are well-known components, which each hold one or more optical fibers such that the end faces of the optical fibers are presented for optical coupling. For example, traditional single fiber optical connectors such as SC or LC connectors include cylindrical ferrules with optical fibers supported and precisely centered within the ferrules. A traditional multi-fiber optical connector such as an MPO connector can include a ferrule that supports a plurality of optical fibers in a row. In the case of MPO connectors, the ferrules of two fiber optic connectors desired to be coupled together have a mating male and female configuration (e.g., a pin and socket configuration) which aligns the ferrules and concurrently aligns the plurality of optical fibers supported by the ferrules.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Fiber optical adapters for ferrule-less connectors can include internal fiber alignment devices configured to receive bare optical fibers of ferrule-less fiber optic connectors desired to be optically coupled together and to align the fiber tips of the fiber optic connectors to enable the transfer of optical signals there between.

In other examples, fiber optic connectors can have male and female configurations which allow the male and female fiber optic connectors to be directly optically coupled together without the need for an intermediate fiber optic adapter.

SUMMARY

The present disclosure relates generally to ferrule-less fiber optic connectors, systems, and methods for enhancing the physical contact or connection interface between a first plurality of optical fibers and a second plurality of optical fibers after a cleaving process.

In certain examples, the cleaving process can deform the surface of the optical fiber and change its diameter such that a major flared side with a maximum flare or a primary flare is formed. During the mating of two optical connectors, if the major flared sides of optical fibers are inserted down into respective fiber alignment grooves to be in contact with a groove surface, misalignment between the two mated optical fibers can occur. This Type of misalignment can negatively affect performance.

The present disclosure is directed at ensuring proper alignment and performance of mated optical fibers by controlling the orientation of the major flared sides relative to a connector keying feature.

One aspect of the present disclosure relates to a fiber optic connection system. The fiber optic connection system can include a first multi-fiber fiber optic connector that includes a first connector body with a front mating end and a first plurality of optical fibers extending forwardly through the first connector body. The first plurality of optical fibers can have ferrule-less end portions accessible at the front mating end of the first connector body and the ferrule-less end portions can each have a maximum flare or primary flare.

The fiber optic connection system can also include a fiber optic adapter that has an adapter body that defines a first port and a second port. The adapter body can include a plurality of fiber alignment grooves for receiving the ferrule-less end portions of the first plurality of optical fibers.

The first multi-fiber fiber optic connector can have a first connector keying feature and the fiber optic adapter can have a first adapter keyway that mates with the first connector keying feature when the first multi-fiber fiber optic connector is inserted into the first port of the adapter body.

The primary flares of the ferrule-less end portions can be positioned relative to the first connector keying feature such that the primary flares are facing away from the plurality of fiber alignment grooves when the first multi-fiber fiber optic connector is inserted into the first port of the adapter body.

Another aspect of the present disclosure relates to a multi-fiber fiber optic connector. The multi-fiber fiber optic connector can include a connector body with a front mating end and a plurality of optical fibers extending forwardly through the connector body. The plurality of optical fibers can have ferrule-less end portions accessible at the front mating end of the connector body.

A keying feature can be provided on the multi-fiber fiber optic connector and the ferrule-less end portions can each have a primary flare positioned relative to the keying feature. The keying feature can align with a keyway of a fiber optic adapter when the multi-fiber fiber optic connector is installed on the fiber optic adapter such that the primary flares of the ferrule-less end portions face away from an alignment feature defined in the fiber optic adapter.

A further aspect of the present disclosure relates to a method of cleaving optical fibers of a ferrule-less multi-fiber fiber optic connector to provide optimal alignment performance. The method can include the following steps: 1) cleaving ferrule-less end portions of optical fibers of the multi-fiber fiber optic connector; 2) identifying a primary flare location on each of the cleaved ferrule-less end portions of the optical fibers; 3) assembling the multi-fiber fiber optic connector such that the primary flare is positioned either up or down; and 4) providing a keying feature on the multi-fiber fiber optic connector to identify the position of the primary flare.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 16 illustrates a side schematic view of another fiber optic connection system having a keying configuration suitable for use with ferrule-less fiber optic connectors having angled cleaves.

DETAILED DESCRIPTION

The present disclosure is directed to keying features of fiber optic connectors and/or adapters that provide a reliable and consistent solution for ensuring proper orientation of flared sides of cleaved optical fibers during mating.

In certain examples, a cleaving technique using a laser (e.g., a laser such as a Carbon Dioxide $CO_2$ or other laser) can be used to largely automate the process. An operator can simply place a ferule-less fiber optic connector into a laser cleaver to allow a laser beam to scan across the optical fibers to cleave it.

Figure 1:
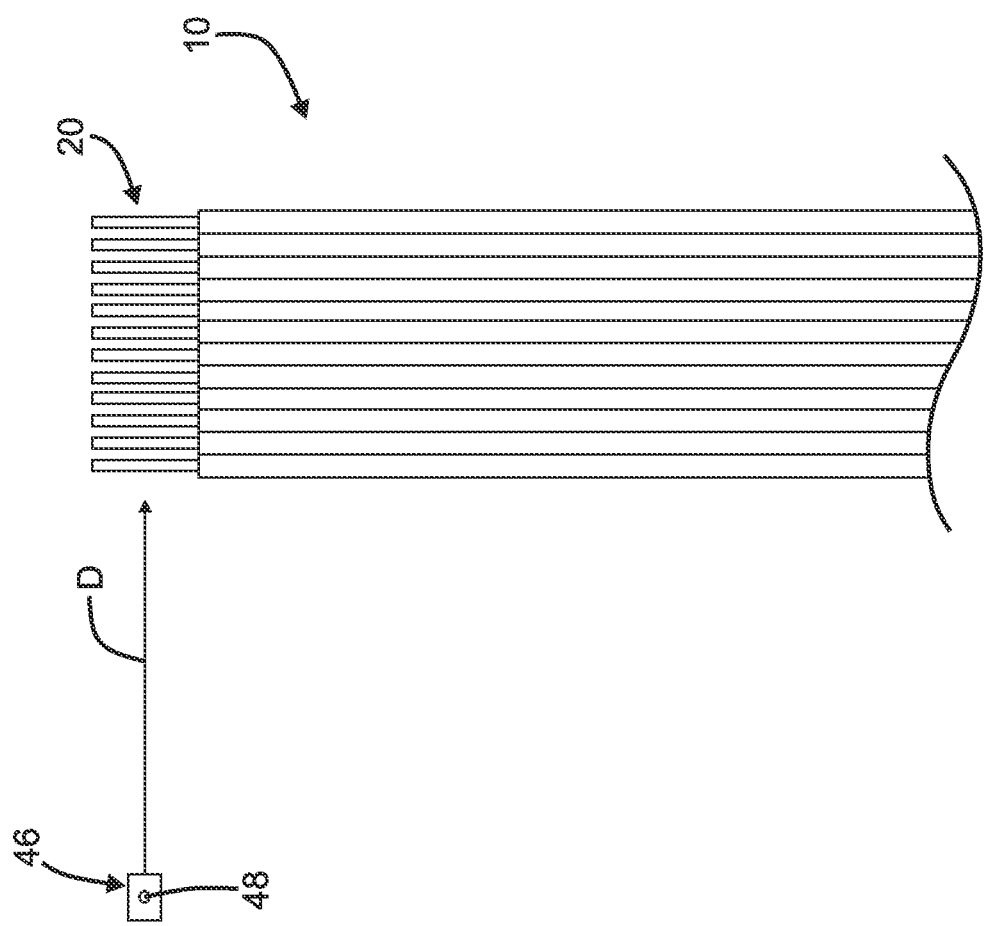
FIG. 1 illustrates a schematic plan view of a multi-fiber ribbon exposed to a laser beam in accordance with principles of the present disclosure.

Turning to FIG. 1, a ribbonized first plurality of optical fibers 10 of a fiber optic cable is shown. In the example shown, the fiber optic cable includes a ribbon of twelve optical fibers 10. In certain examples, however, the fiber optic cable may include a greater or lesser number of optical fibers 10 (e.g., one fiber, two fibers, six fibers, eight fibers, twenty-four fibers, etc.).

Figure 2:
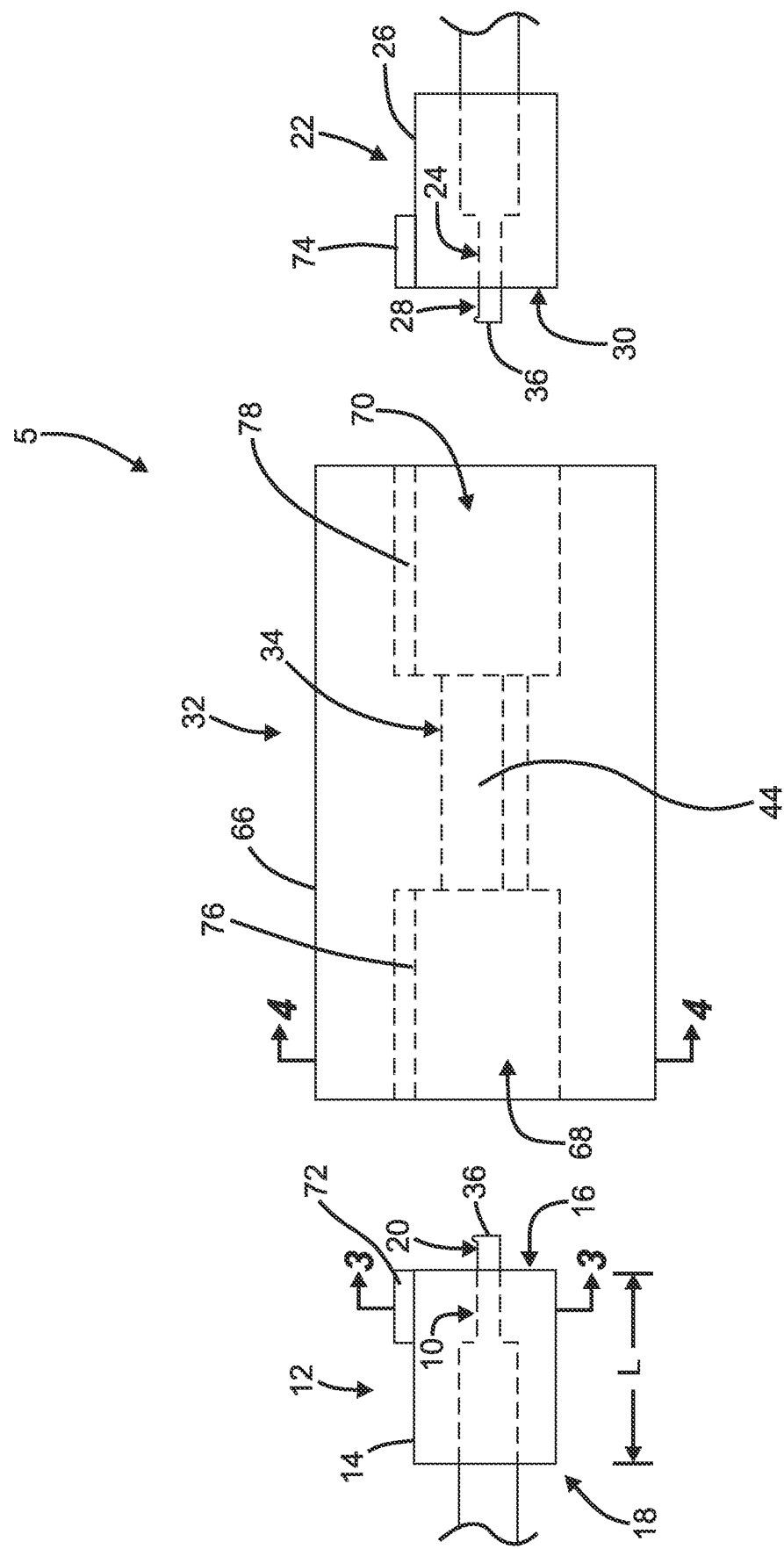
FIG. 2 illustrates a side schematic view of a fiber optic connection system including first and second fiber optic connectors with keying features that are adapted to mate with keyways of a fiber optic adapter upon installation to orient flaring portions of the optical fibers away from alignment grooves of the fiber optic adapter in accordance with the principles of the present disclosure.

FIG. 2 shows an example fiber optic connection system 5 including a first multi-fiber fiber optic connector 12, a second multi-fiber fiber optic connector 22 and a fiber optic adapter 32.

The first multi-fiber fiber optic connector 12 is suitable for terminating the first plurality of optical fibers 10 shown in FIG. 1. The first multi-fiber fiber optic connector 12 includes a first connector body 14 that has a front mating end 16 and a rear end 18 separated by a length L of the first connector body 14. The first multi-fiber fiber optic connector 12 is a ferrule-less multi-fiber fiber optic connector. The first plurality of optical fibers 10 can extend forwardly through the first connector body 14 such that ferrule-less end portions 20 of the first plurality of optical fibers 10 are accessible at the front mating end 16 of the first connector body 14.

Similarly, the second multi-fiber fiber optic connector 22 includes a second plurality of optical fibers 24 that can extend forwardly through a second connector body 26 such that ferrule-less end portions 28 of the second plurality of optical fibers 24 are accessible at a front mating end 30 of the second connector body 26. The second multi-fiber fiber optic connector 22 is a ferrule-less multi-fiber fiber optic connector. In certain examples, the first plurality of optical fibers 10 can be of an outside plant cable and the second plurality of optical fibers 24 can be of an inside plant cable.

Figure 3:
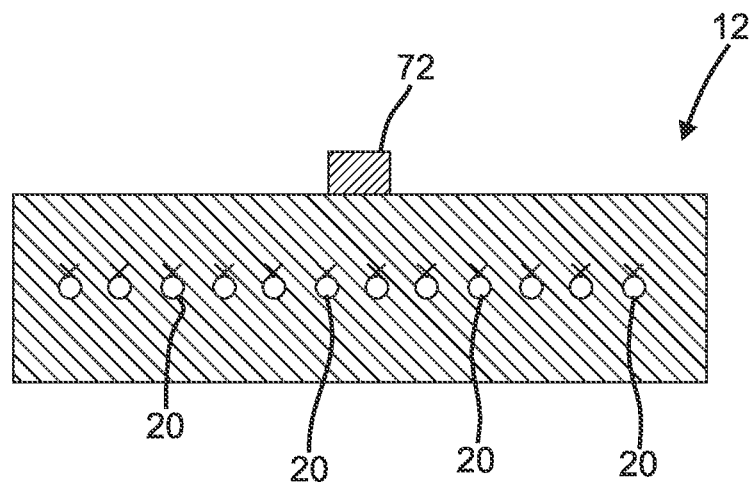
FIG. 3 illustrates a cross-sectional view of the connector body taken along section line 3-3 of FIG. 2.

FIG. 3 shows the first plurality of optical fibers 10 aligned in the first connector body 14 of the first multi-fiber fiber optic connector 12. It will be appreciated that the second plurality of optical fibers 24 can be oriented similarly in the second connector body 26 of the multi-fiber fiber optic connector 22. The fiber optical adapter 32 can be used to assist in optically coupling together the first and second multi-fiber fiber optic connectors 12, 22. In certain examples, cleaved ends of the optical fibers 10, 24 can include sides with primary flares the locations of which are indicated schematically at FIG. 3 by x's.

Still referring to FIG. 2, the fiber optic adapter 32 includes a fiber alignment structure 34. The fiber optic adapter 32 includes an adapter body 66 that defines a first port 68 for receiving the first multi-fiber fiber optic connector 12 and a second port 70 for receiving the second multi-fiber fiber optic connector 22. The first and second multi-fiber fiber optic connectors 12, 22 are shown prior to insertion into the first and second adapter ports 68, 70, respectively. The first and second multi-fiber optic connectors 12, 22 can be coupled together by inserting the first and second multi-fiber optic connectors 12, 22 within coaxially aligned ports 68, 70 of the fiber optic adapter 32. Continued insertion of the first and second multi-fiber fiber optic connectors 12, 22 causes the ferrule-less end portions 20, 28 to enter the fiber alignment structure 34.

Figure 4:
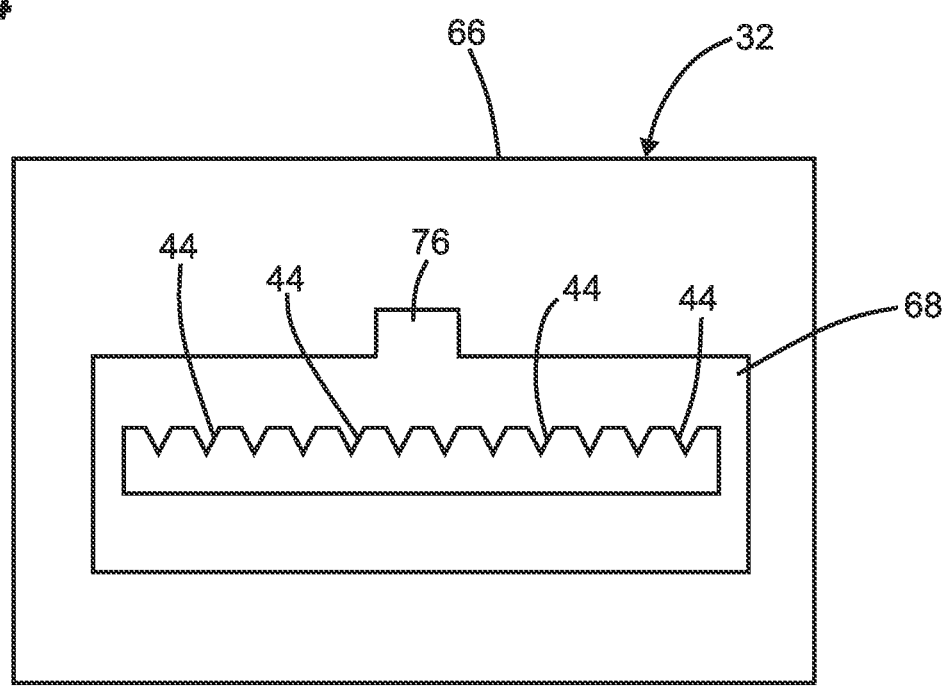
FIG. 4 illustrates a cross-sectional view of the fiber optic adapter taken along section line 4-4 of FIG. 2.

FIG. 4 shows the fiber alignment structure 34 including a plurality of fiber alignment grooves 44, such as a V-grooves, although alternatives are possible. The plurality of fiber alignment grooves 44 can be configured to receive and align ferrule-less end portions 20, 28 of the first and second plurality of optical fibers 10, 24 such that end faces 36 (e.g., front end portions) of the ferrule-less end portions 20, 28 can abut one another to optically couple the first and second plurality of optical fibers 10, 24 together and enable the transfer of optical signals.

In certain examples, the fiber alignment structure 34 can include a biasing structure such as a spring-loaded component that biases the optical fibers toward fiber alignment surfaces (e.g., surfaces defining a v-groove) of the plurality of fiber alignment grooves 44.

Figure 5:
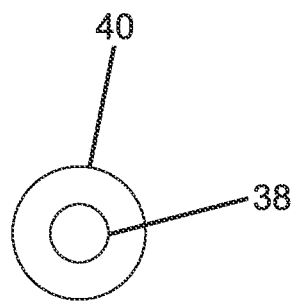
FIG. 5 is a cross-sectional view of a bare fiber portion of the optical fiber.
Figure 6:
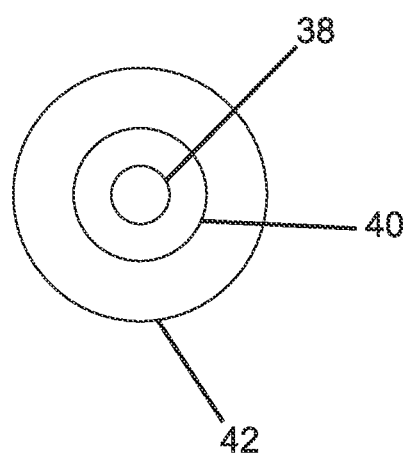
FIG. 6 is a cross-sectional view of a coated fiber portion of the optical fiber.

Referring to FIGS. 5-6, the ferrule-less end portions 20, 28 of the first and second plurality of optical fibers 10, 24 can include a bare fiber that includes an optical core 38 surrounded by a cladding layer 40. In certain examples, one or more coating layers 42 may surround the cladding layer 40 within the connector bodies, but preferably the end portions 20, 28 are uncoated. The optical core 38 and the cladding layer 40 can have different indexes of refraction that are selected to cause light to propagate through the optical fiber via total internal reflection.

Optical fibers can include single mode optical fiber and multi-mode optical fibers. Generally, single mode optical fibers have smaller cores than multi-mode optical fibers. For example, a traditional single mode optical fiber has a core with a diameter in the range of 8-10 microns and a cladding layer with an outer diameter in the neighborhood of 125 microns. In contrast, multi-mode optical fibers transitionally have cores with diameters of about 50 microns or about 62.5 microns, and cladding layers with outer diameters of about 125 microns. Aspects of the present disclosure are applicable to both single mode and multi-mode optical fibers.

Turning again to FIG. 1, a laser 46 is depicted to cleave the ferrule-less end portions 20 of the first plurality of optical fibers 10. In certain examples, the laser 46 is a gas laser device such as a $CO_2$ laser, but other laser types can be used as well.

As shown at FIG. 1, the laser 46 can be projected along a laser beam axis 48. To cleave a row of fibers such as the fibers 10, 24, the laser 46 can be moved along a scan direction D across the row of fibers to individually cleave the optical fibers of the row starting with the first fiber (e.g., fiber one) and continuing across the row until all of the optical fibers (e.g., fibers one through twelve) have been cleaved.

The scan direction D is along an orientation perpendicular with respect to the axes of the optical fibers and also perpendicular with respect to the laser beam axis 48.

Figure 7:
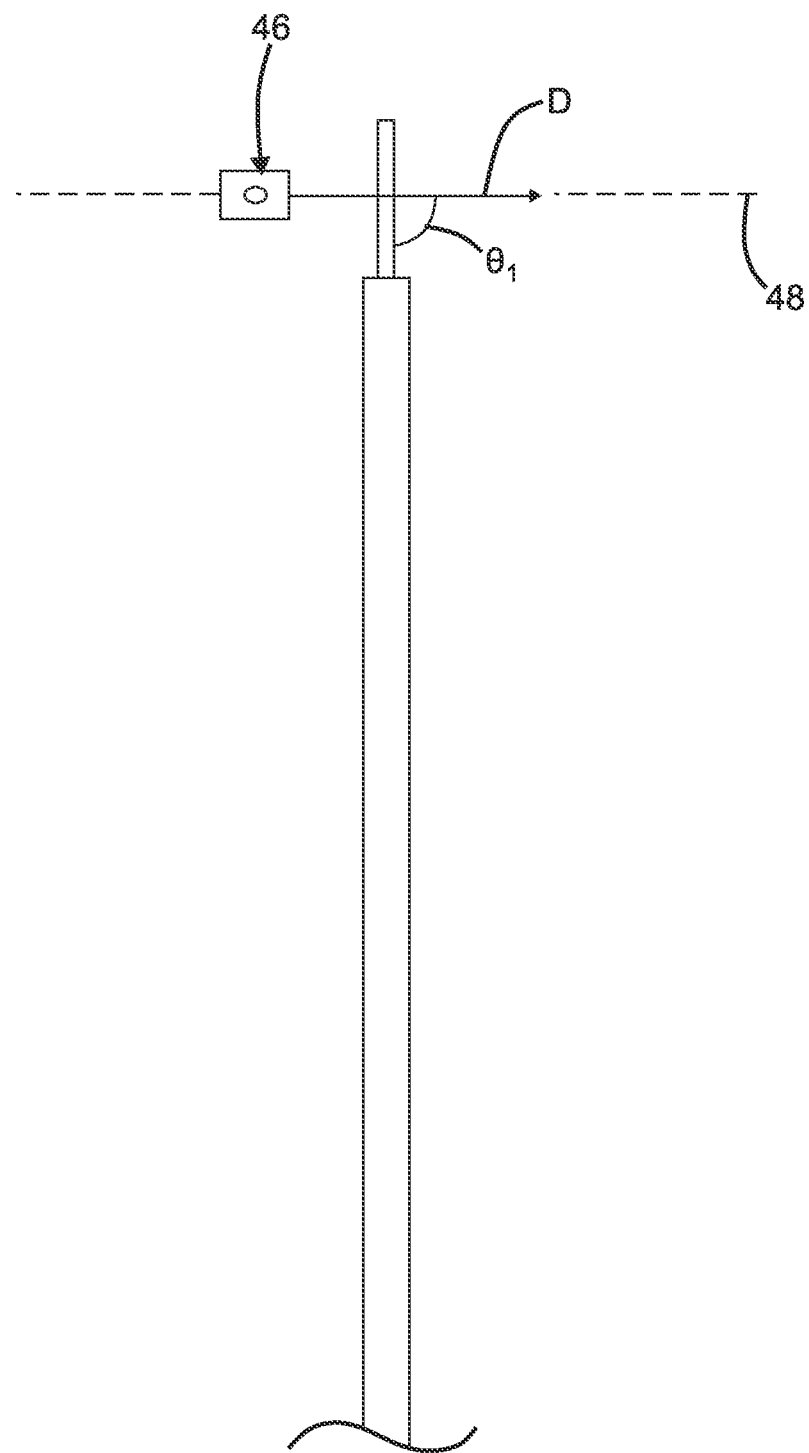
FIG. 7 illustrates a laser beam positioned to provide a 90 degree optical fiber cleave along a laser beam axis from an entrance side to an exit side in accordance with the principles of the present disclosure.

In the example of FIGS. 1 and 7, the laser 46 is used to provide a perpendicular cleave of the optical fibers. Thus, as shown in FIG. 7, the laser 46 is oriented with the laser beam axis 48 perpendicular with respect to the axes of the ferrule-less end portions 20 of the optical fibers being cleaved (e.g., the angle $\Theta_1$ of cleaving defined between the laser axes 48 and the axes of the fibers is about 90 degrees).

Figure 8:
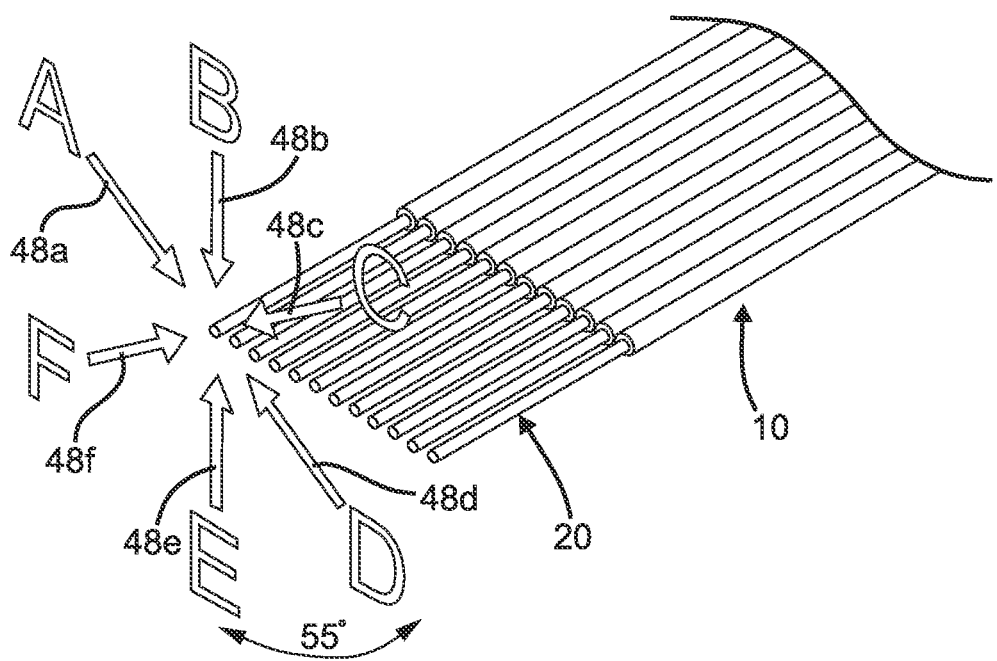
FIG. 8 illustrates a perspective view of the multi-fiber ribbon of FIG. 1 showing rotational positions A-F about an axis of one of the optical fibers.

FIG. 8 shows various rotational positions A-F spaced rotationally about a fiber axis of one of the optical fibers to be cleaved.

Figure 9:
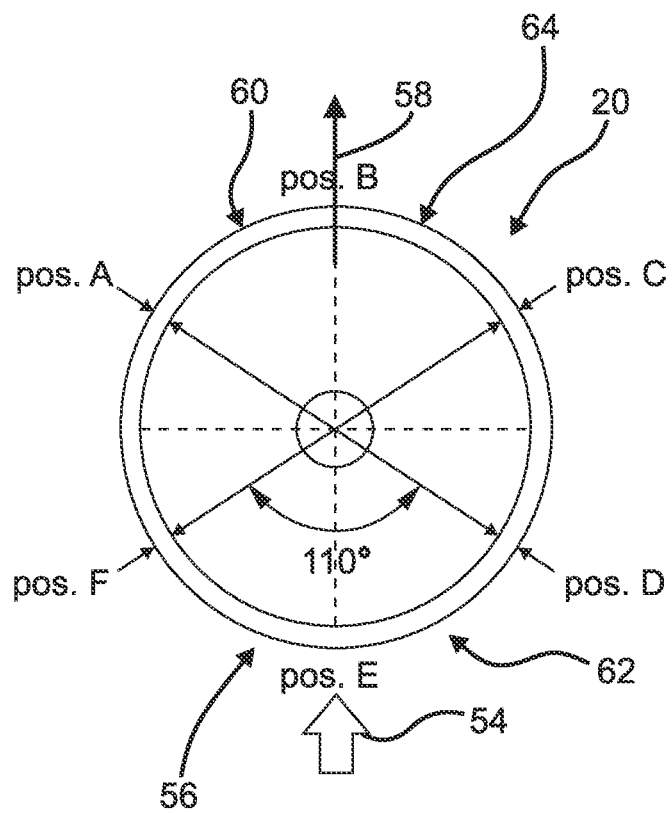
FIG. 9 illustrates an end view of an example optical fiber exposed to a laser beam that enters at an entry point (e.g., position E) that forms a major flaring side and an exit point (e.g., position B) that forms a minor flaring side.

Turning to FIG. 9, when cleaving the optical fibers 10, the laser 46 is directed through the optical fiber 10 along a path having an entry location 54 (e.g., laser entrance side, position E) and an exit location 58 (e.g., laser exit side, position B). During laser cleaving, the laser can cause melting, flowing and misting of the glass of the optical fiber being cleaved which generates flaring (e.g., mushrooming) of the end of the optical fiber. Because more energy is absorbed by the at the entry location 54 as compared to the exit location 58, flaring is more prominent at the laser entrance side of the fiber as compared to the laser exit side of the fiber. Thus, a maximum flare 56 (e.g., a primary flare, major flare) is formed at the entry location 54 and a minimum flare 60 (e.g., minor flare) is formed on the optical fiber 10 at the exit location 58.

Figure 10:
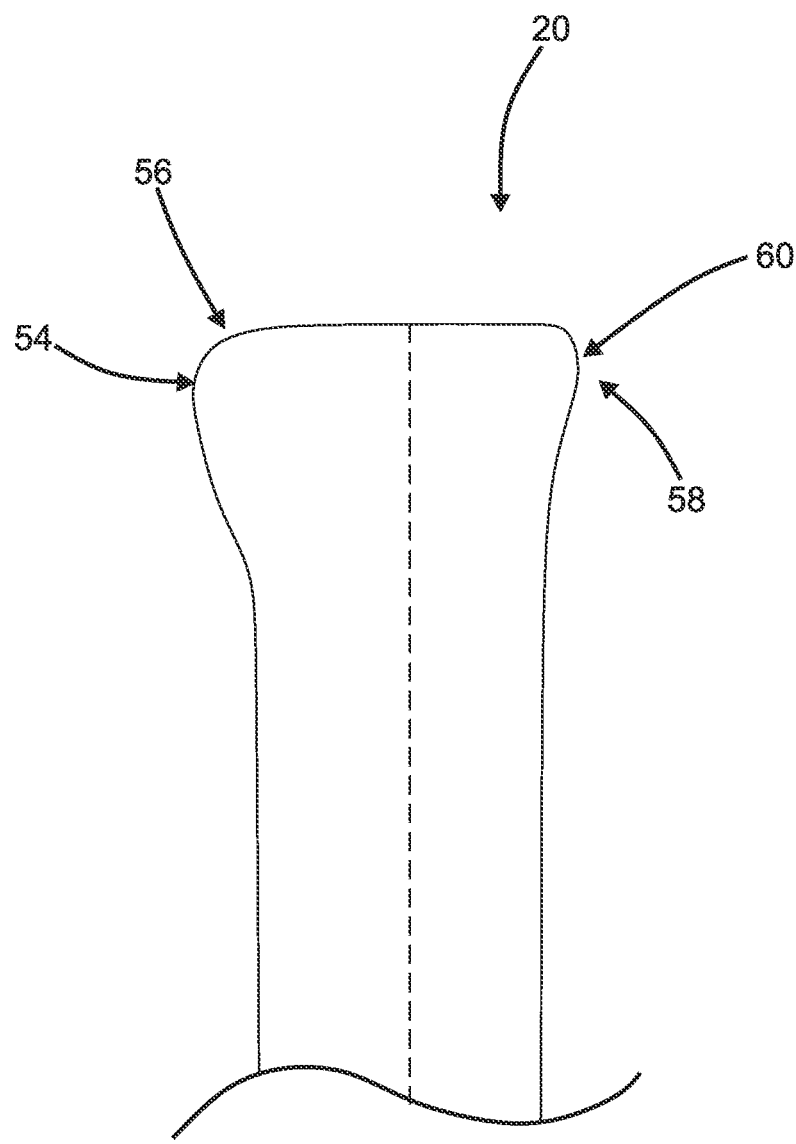
FIG. 10 illustrates an enlarged view of an example optical fiber after a laser cleave showing the major and minor flaring sides in accordance with the principles of the present disclosure.

Turning to FIG. 10, an exaggerated illustration of an enlargement of a cleaved ferrule-less end portion 20 is shown. The ferrule-less end portion 20 has a first flared side 62 and a second flared side 64. The maximum flare 56 can be located at the first flared side 62 and the minimum flare 60 can be located at the second flared side 64 such that the first flared side 62 is larger than the second flared side 64.

Turning again to FIG. 2, when the first and second multi-fiber fiber optic connectors 12, 22 are mated, the performance of the optical fibers can be limited by the presence of flaring due to the cleaving process. Thus, to ensure proper fiber alignment and performance of the first and second multi-fiber fiber optic connectors 12, 22, it is important to establish/set the orientation of the maximum flared sides 56 of the optical fibers relative to first and second keying features 72, 74 respectively provided on the first and second connector bodies 14, 26 of the first and second multi-fiber fiber optic connectors 12, 22. Example keying structures can include rails, projections, grooves or other structures.

The fiber optical adapter 32 includes first and second adapter keyways 76, 78. The first and second keying features 72, 74 are configured to fit within corresponding first and second adapter keyways 76, 78 defined by the fiber optic adapter 32 or connector ports 68, 70. The first adapter keyway 76 receives the first connector keying feature 72 when the first multi-fiber fiber optic connector 12 is inserted into the first port 68 of the adapter body 66. The second adapter keyway 78 receives the second connector keying feature 74 when the second multi-fiber fiber optic connector 22 is inserted into the second port 70 of the adapter body 66. The keying features of the first and second multi-fiber fiber optic connectors 12, 22 and the fiber optic adapter 32 allow the first and second multi-fiber fiber optic connectors 12, 22 to be respectively inserted into the first and second adapter ports 68, 70, such that the maximum flares 56 of the ferrule-less end portions 20, 28 are oriented away from the plurality of fiber alignment grooves 44 of the fiber alignment structure 34.

Figure 11:
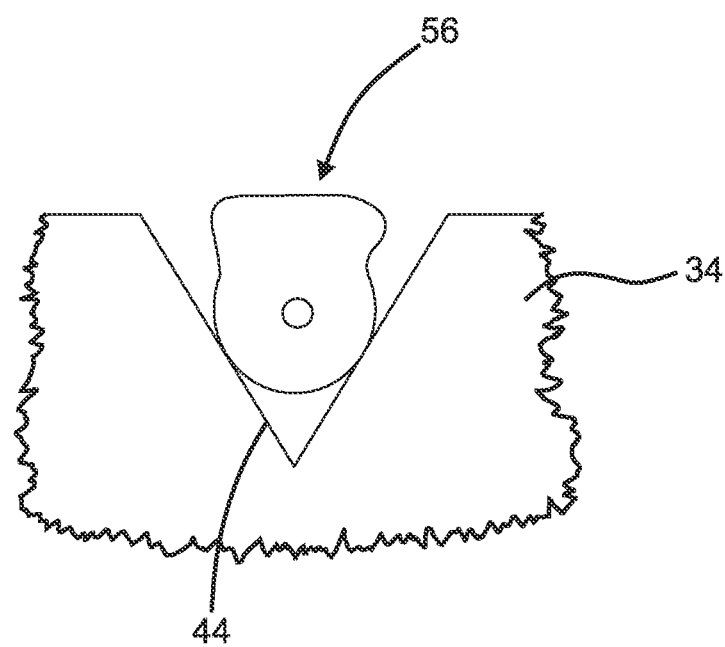
FIG. 11 illustrates an end view of the optical fiber of FIG. 10 in an alignment groove with the major flaring side away from the alignment groove.

Referring to FIG. 11, an enlargement of an optical fiber inserted into the fiber alignment groove 44 is shown with the maximum flared side 56 positioned away from the fiber alignment groove 44. The maximum flares 56 of the ferrule-less end portions 20, 28 are positioned relative to the first and second keying features 72, 74 such that when the first and second multi-fiber fiber optic connectors 12, 22 are inserted into the first and second adapter ports 68, 70, the maximum flares 56 will be oriented away from the fiber alignment grooves 44. Otherwise, if the maximum flares 56 of the optical fibers are inserted down into the lowest level (e.g., groove surface) of a respective fiber alignment grooves 44, misalignment between the mated optical fibers can occur. In the depicted example, the keys 72, 74 are up, the maximum flares 56 face up, the keyways 76, 78 are at the tops sides of the ports 68, 70 and the alignment grooves 44 face up but are at the bottom of the adapter. The keys 72, 74 and keyways 76, 78 prevent the connectors 12, 22 from being inserted into the ports 68, 70 with the primary flares 56 facing downwardly. Thus, the keying arrangement is configured to ensure that the connectors 12, 22 are loaded into the adapter ports 68, 70 with the primary flares 56 facing away from the alignment grooves 44 such that the primary flares 56 are prevented from contacting the alignment surfaces of the alignment grooves 44.

Figure 12:
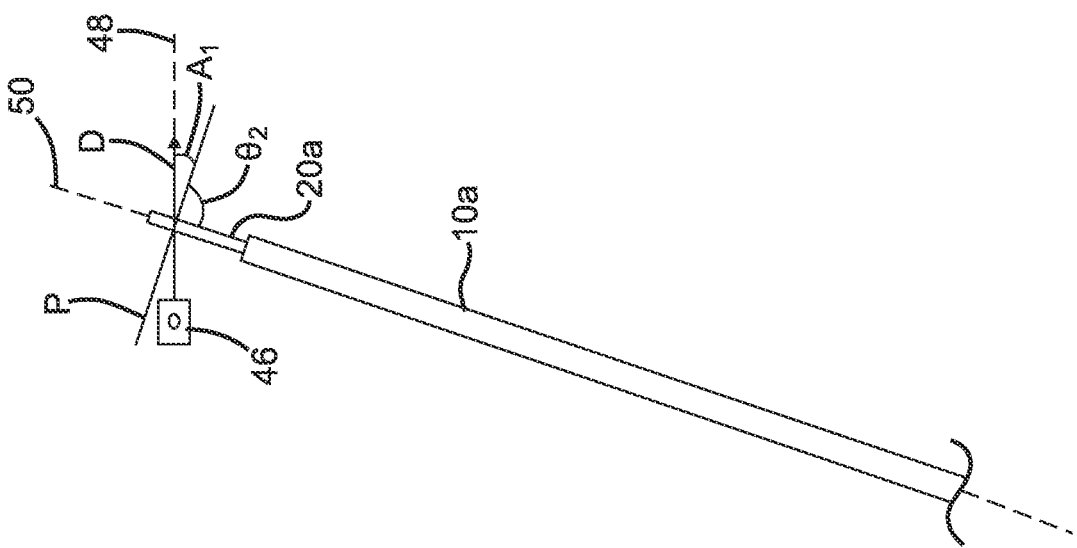
FIG. 12 illustrates a side view of a laser cleave for a first optical fiber of the first connector of FIG. 2 with an angled cleave.

Referring to FIG. 12, the laser 46 is oriented to provide an angled laser cleave for optical fibers of the first multi-fiber optic connector 12. A perpendicular reference line P defines an angle $\Theta_2$ that is about 90 degrees relative to a central axis 50 of the optical fiber 10a.

Similar to the previous example, the laser 46 is scanned across the row of optical fibers of the connector 12 to individually cleave each fiber. However, unlike the previous example, the laser beam axis 48 is not aligned along the reference line P, but is instead oriented at an acute angle $A_1$ relative to the reference line P. In certain examples, the laser beam axis 48 can create an angled cleave that is in the range of 6° to 10° relative to the perpendicular reference line P, although alternatives are possible. In a preferred example, the angled cleave is 8°, although alternative are possible. Depending on how the ferrule-less end portions 20, 28 of the first and second plurality of optical fibers 10, 24 are oriented relative to the laser 46, the maximum flares 56 can be formed at a base end or a tip end of the optical fiber.

Figure 13:
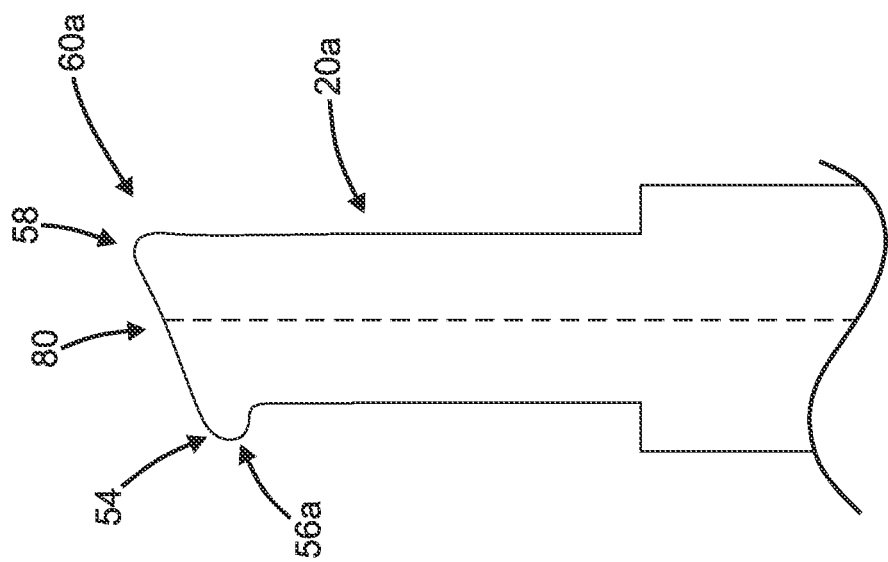
FIG. 13 illustrates an enlarged view of the optical fiber of FIG. 12 after the laser cleave showing the major and minor flaring sides.

Referring to FIG. 13, an exaggerated illustration of an angled fiber cleave that results from the cleaving arrangement of FIG. 12. FIG. 13 is an enlargement of a cleaved ferrule-less end portion 20a that has been cleaved with an angle cleave using the arrangement of FIG. 12. The ferrule-less end portion 20a has a maximum flare 56a at the entry location 54 of the laser beam 48 and a minimum flare 60a at the exit location 58 of the laser beam 48. The maximum flare 56a is at a tip of the angled cleave.

Figure 14:
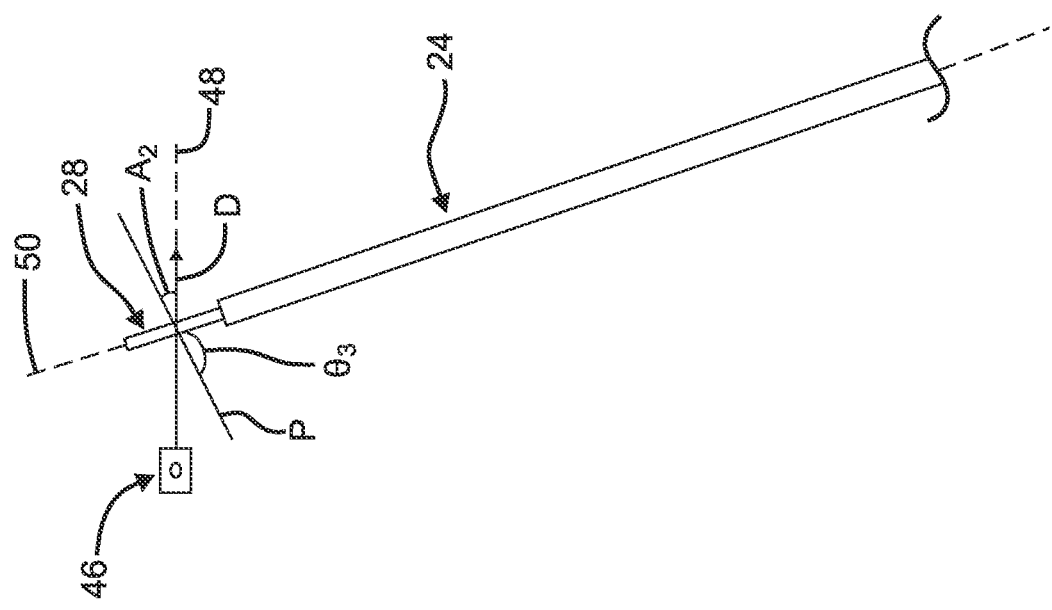
FIG. 14 illustrates a side view of a laser cleave for a first optical fiber of the second connector of FIG. 2 with an angled cleave.

Referring to FIG. 14, an example cleaving arrangement is illustrated for providing the optical fibers of second multi-fiber fiber optic connector 22 with angled cleaves. A similar cleaving process using the laser 46 described above for the first plurality of optical fibers 10 can also apply to the second plurality of optical fibers 24. The laser beam axis 48 can move/scan across the ferrule-less end portions 28 of the second plurality of optical fibers 24 to create cleaves each having an angle $A_2$. The angled cleave $A_2$ can be about 8 degrees from the perpendicular reference line P to the central axis 50, although alternatives are possible. The perpendicular reference line P defines an angle $\Theta_3$ that is about 90 degrees relative to the central axis 50 of the optical fiber 24. After cleaving the ferrule-less end portion 28, a maximum flare 56b can be formed at the laser entrance side 54 and a minimum flare 60b can be formed at the laser exit side 58.

Figure 15:
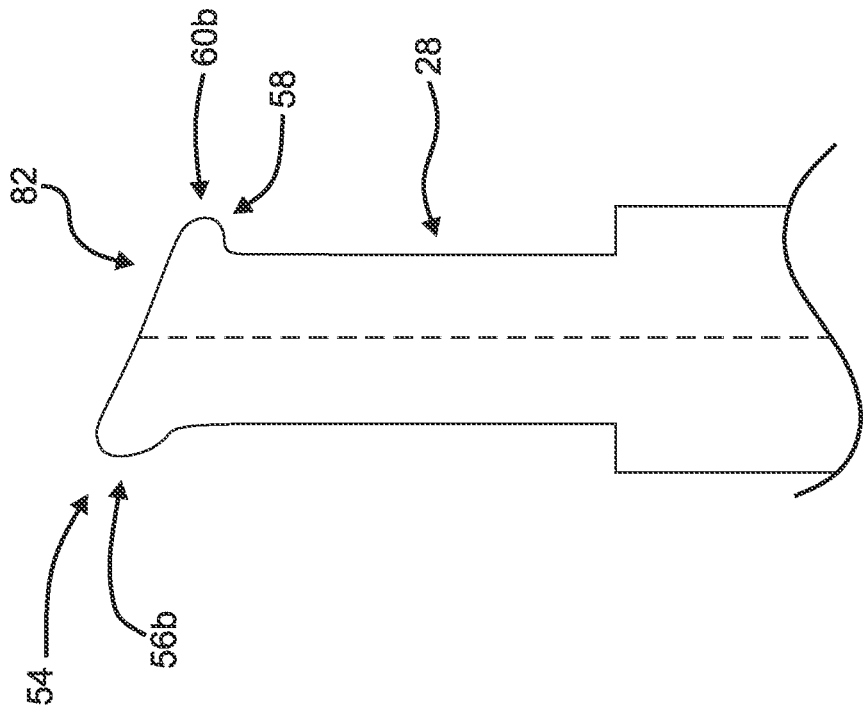
FIG. 15 illustrates an enlarged view of the optical fiber of FIG. 14 after the laser cleave showing the major and minor flaring sides.

FIG. 15 illustrates an exaggerated illustration of an angled fiber cleave that results from the cleaving arrangement shown in FIG. 14. The cleaved ferrule-less end portion 20a of FIG. 15 has a maximum flare 56a at the entry location 54 of the laser beam 48 and a minimum flare 60a at the exit location 58 of the laser beam 48. The maximum flare 56a is at a base of the angled cleave.

In certain examples, the first keying feature 72 of the first multi-fiber fiber optic connector 12 can be different from the second keying feature 74 of the second multi-fiber fiber optic connector 22. The difference can be in the shape, size, or location of the keying feature. For a given keyed adapter having keyed first and second ports, the keying arrangement allows the first connector to be inserted into the first port in only one rotational orientation (with the major flares facing away from the alignment grooves) and prevents the first connector from being inserted into the second port. Similarly, the keying arrangement allows the second connector to be inserted into the second port in only one rotational orientation (with the major flares facing away from the alignment grooves) and prevents the second connector from being inserted into the first port. Preferably, the end faces of the fibers of the connectors are parallel and in contact with one another when the connectors are inserted in their respective adapter ports.

Turning to FIG. 16, another fiber optic connection system 5a is depicted. In this example, the first keying feature 72 of the first multi-fiber fiber optic connector 12 is configured up with the major flare 56a facing upwardly toward the keying feature 72, and the second keying feature 74 of the second multi-fiber fiber optic connector 22 is configured down with the major flare 56a facing upwardly away from the keying feature 74. The first adapter keyway 76 is positioned up in the fiber optic adapter 32 to receive the first keying feature 72 and the second adapter keyway 78 is positioned down in the fiber optic adapter 32 to receive the second keying feature 74. As such, the first multi-fiber fiber optic connector 12 is received in the first adapter port 68 with the angled faces of the fibers facing up away from the alignment grooves 44 and the major flares 56a facing up away from the alignment grooves 44, and the second multi-fiber fiber optic connector 22 is received within the second adapter port 70 with the angled faces of the fibers face down toward the alignment grooves 44 and the major flares 56a face up away from the alignment grooves 44.

Figure 17:
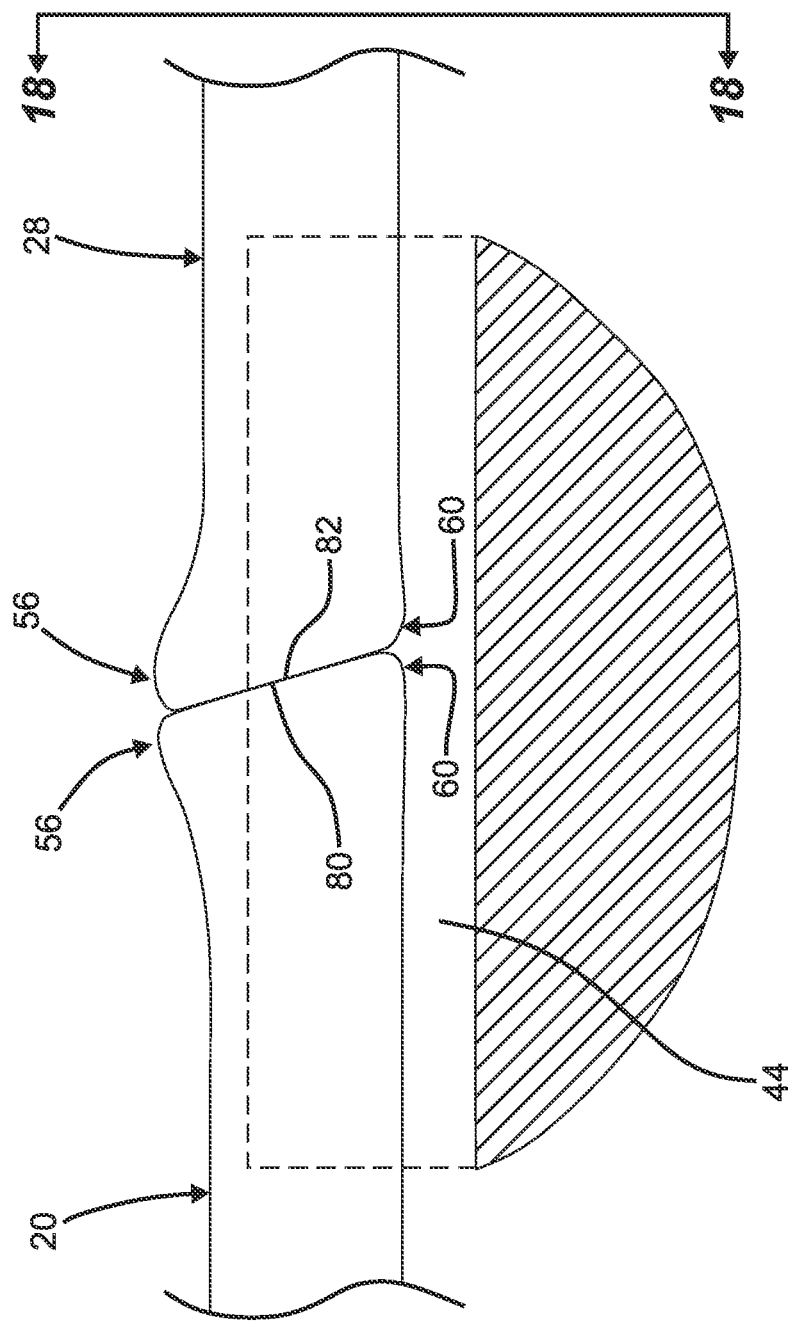
FIG. 17 illustrates the mating of the optical fibers of the fiber optic connectors of FIG. 16 with the primary flares of the cleaved ends of the optical fibers facing away from a fiber alignment groove of a fiber optic adapter that couples the fiber optic connectors together.

Referring to FIG. 17, the first and second ferrule-less multi-fiber fiber optic connectors 12, 22 can be inserted into the fiber optical adapter 32 such that the minimum flares 60 of the first and second optical fibers 10, 24 are in contact with alignment surfaces 84 of the fiber alignment grooves 44 to ensure proper alignment. That is, when the first and second optical fibers 10, 24 are inserted into the fiber alignment grooves 44, first and second cleaved ferrule-less ends 80, 82 of the first and second optical fibers 10, 24 are aligned parallel to each other such that the maximum flare 56a of the first cleaved ferrule-less end 80 opposes the maximum flare 56a of the second cleaved ferrule-less end 82 and the minimum flare 60a of the first cleaved ferrule-less end 80 opposes the minimum flare 60a of the second cleaved ferrule-less end 82. The maximum flares 56a of the optical fibers of both the first and second ferrule-less multi-fiber fiber optic connectors 12, 22 face away from the alignment grooves 44.

Figure 18:
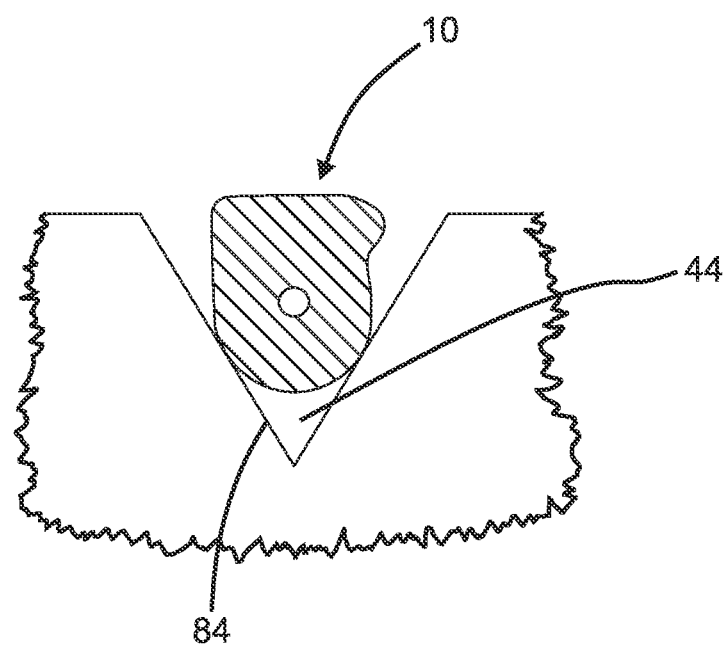
FIG. 18 is a partial cross-sectional view of FIG. 17 showing one of the optical fibers in the fiber alignment groove.

Turning to FIG. 18, a cross-sectional view of the fiber alignment groove 44 shows the maximum flare 56a positioned away from the fiber alignment groove 44 while the minimum flare 60a is in contact with the alignment surfaces 84 of the fiber alignment groove 44. That is, the minimum flares 60a can be arranged and configured to contact the alignment surfaces of the alignment groove while the maximum flares 56 face away from the alignment surfaces 84. As such, when minimum flared ends of the ferrule-less end portions 20, 28 are matched, proper alignment can be achieved between the first and second ferrule-less multi-fiber fiber optic connectors 12, 22 to provide ultimate performance and low insertion loss.

It will be appreciated that the fiber alignment grooves 44 may be oriented in either a top part of the fiber alignment feature 34 or a bottom part of the fiber alignment feature 34 and the keyways can be flipped accordingly. That is, fiber alignment grooves of a fiber alignment feature may face up or down. Because the maximum flares 56 are positioned relative to the first and second connector keying features 72, 74, the maximum flares 56 can be prevented from engaging the contact alignment surface 84 of the fiber alignment grooves 34. As a result, the maximum flares 56 will face away from the contact alignment surface 84 and not interfere with achieving proper alignment between the optical fibers.

Another aspect of the present disclosure relates to a method of cleaving optical fibers of a ferrule-less multi-fiber fiber optic connector to provide optimal alignment performance. The method can include the following steps: 1) cleaving ferrule-less end portions of optical fibers of the multi-fiber fiber optic connector; 2) identifying a primary flare location on each of the cleaved ferrule-less end portions of the optical fibers; 3) assembling the multi-fiber fiber optic connector such that the primary flare is positioned either up or down; and 4) providing a keying feature on the multi-fiber fiber optic connector to identify the position of the primary flare.

In certain examples, the step of cleaving includes exposing the ferrule-less end portions of the first and second sets of optical fibers to a laser.

From the forgoing detailed description, it will be evident that modifications and variations can be made without departing from the spirit and scope of the disclosure.

What is claimed is:

1. A fiber optic connection system, comprising:
    a first multi-fiber fiber optic connector including a first connector body having a front mating end and a first plurality of optical fibers extending forwardly through the first connector body, the first plurality of optical fibers having ferrule-less end portions accessible at the front mating end of the first connector body, the ferrule-less end portions each having a primary flare; and
    a fiber optic adapter including an adapter body defining a first port and a second port, the adapter body including a plurality of fiber alignment grooves for receiving the ferrule-less end portions of the first plurality of optical fibers;
    wherein the first multi-fiber fiber optic connector has a first connector keying feature and the fiber optic adapter has a first adapter keyway that mates with the first connector keying feature when the first multi-fiber fiber optic connector is inserted into the first port of the adapter body; and
    wherein the primary flares of the ferrule-less end portions are positioned relative to the first connector keying feature such that the primary flares are facing away from the plurality of fiber alignment grooves when the first multi-fiber fiber optic connector is inserted into the first port of the adapter body.

2. The fiber optic connection system of claim 1, wherein the ferrule-less end portions each have a first flared side and a second flared side positioned opposite the first flared side, and wherein the primary flares of the ferrule-less end portions are located at the first flared side.

3. The fiber optic connection system of claim 2, wherein the first flared sides are larger than the second flared sides.

4. The fiber optic connection system of claim 2, wherein when the first multi-fiber fiber optic connector is inserted into the first port of the adapter body, the ferrule-less end portions of the first plurality of optical fibers are oriented such that the second flared sides engage a contact alignment surface of the plurality of fiber alignment grooves.

5. The fiber optic connection system of claim 1, wherein the primary flares are facing toward an open sided part of the plurality of fiber alignment grooves opposite a contact alignment surface of the plurality of fiber alignment grooves.

6. The fiber optic connection system of claim 1, further comprising a second multi-fiber fiber optic connector including a second connector body and a second plurality of optical fibers, the second multi-fiber fiber optic connector having a second connector keying feature.

7. The fiber optic connection system of claim 6, wherein the fiber optic adapter includes a second adapter keyway for mating with the second connector keying feature when the second multi-fiber fiber optic connector is inserted into a second port of the fiber optic adapter, the fiber optic adapter being configured to couple the first and second multi-fiber fiber optic connectors together such that front end portions of the first plurality of optical fibers are co-axially aligned with front end portions of the second plurality of optical fibers to allow optical signals to be conveyed between the first plurality of optical fibers and the second plurality of optical fibers.

8. The fiber optic connection system of claim 6, wherein the first multi-fiber fiber optic connector is of a first type and the second multi-fiber fiber optic connector is of a second type that is different from the first type.

9. The fiber optic connection system of claim 8, wherein the first plurality of optical fibers are of an outside plant cable and the second plurality of optical fibers are of an inside plant cable.

10. A multi-fiber fiber optic connector, comprising:
    a connector body having a front mating end and a plurality of optical fibers extending forwardly through the connector body, the plurality of optical fibers having ferrule-less end portions accessible at the front mating end of the connector body, the ferrule-less end portions each having a primary flare;
    a keying feature provided on the multi-fiber fiber optic connector, wherein the ferrule-less end portions each have a primary flare positioned relative to the keying feature, the keying feature being configured to align with a keyway of a fiber optic adapter when the multi-fiber fiber optic connector is installed on the fiber optic adapter such that the primary flares of the ferrule-less end portions face away from an alignment feature defined in the fiber optic adapter.

11. The multi-fiber fiber optic connector of claim 10, wherein the ferrule-less end portions each have a first flared side and a second flared side positioned opposite the first flared side, and wherein the primary flares of the ferrule-less end portions are located at the first flared side.

12. The multi-fiber fiber optic connector of claim 11, wherein the first flared sides are larger than the second flared sides.

13. The multi-fiber fiber optic connector of claim 10, wherein the primary flares are facing toward an open sided part of the alignment feature opposite a contact alignment surface of the alignment feature.

14. A method of cleaving optical fibers of a ferrule-less multi-fiber fiber optic connector to provide optimal alignment performance, the method comprising:
cleaving ferrule-less end portions of optical fibers of the multi-fiber fiber optic connector;
identifying a primary flare location on each of the cleaved ferrule-less end portions of the optical fibers;
assembling the multi-fiber fiber optic connector such that the primary flare is positioned either up or down; and
providing a keying feature on the multi-fiber fiber optic connector to identify the position of the primary flare.

15. The method of claim 14, wherein the ferrule-less end portions each have a first flared side and a second flared side positioned opposite the first flared side, and wherein the primary flares of the ferrule-less end portions are located at the first flared side.

16. The method of claim 15, wherein the first flared sides are larger than the second flared sides.

17. The method of claim 16, wherein the ferrule-less end portions of the optical fibers are oriented such that the second flared sides engage an alignment surface of a plurality of fiber alignment grooves of an adapter.

18. The method of claim 17, wherein the primary flares are facing toward an open sided part of the plurality of fiber alignment grooves opposite the alignment surface of the plurality of fiber alignment grooves.

19. The method of claim 15, wherein the step of cleaving includes exposing the ferrule-less end portions of the optical fibers to a laser.

20. The method of claim 19, wherein the laser is a $CO_2$ laser.

21. The method of claim 19, wherein the primary flares are located at an entry point of the laser.

22. The method of claim 19, wherein the second flared sides are located at an exit point of the laser.

23. The method of claim 19, wherein the laser cleaves the ferrule-less end portions of the optical fibers at an angle relative to a reference plane perpendicular to an axis of the optical fibers.

24. The method of claim 23, wherein the angle ranges from about 6 degrees to about 10 degrees.

* * * * *